United States Patent
Zottmann et al.

(10) Patent No.: US 6,962,533 B2
(45) Date of Patent: Nov. 8, 2005

(54) TORSIONAL VIBRATION DAMPER, ESPECIALLY A DUAL-MASS FLYWHEEL

(75) Inventors: Michael Zottmann, Niederwerrn (DE); Jürgen Kleifges, Schweinfurt (DE); Bernhard Schierling, Kürnach (DE); Alexander Manger, Grettstadt (DE)

(73) Assignee: ZF Sachs AG, Schweinfurt (DE)

( * ) Notice: Subject to any disclaimer, the term of this patent is extended or adjusted under 35 U.S.C. 154(b) by 70 days.

(21) Appl. No.: 10/298,738

(22) Filed: Nov. 18, 2002

(65) Prior Publication Data

US 2003/0114228 A1 Jun. 19, 2003

(30) Foreign Application Priority Data

Dec. 18, 2001  (DE) .......................................... 101 62 162

(51) Int. Cl.[7] .................................................. F16D 3/12
(52) U.S. Cl. ........................ 464/68; 192/205; 192/213
(58) Field of Search ...................... 464/65–68; 192/205, 192/213, 213.2

(56) References Cited

U.S. PATENT DOCUMENTS

| | | | | |
|---|---|---|---|---|
| 5,080,970 A | * | 1/1992 | Davies | 428/332 |
| 5,168,773 A | * | 12/1992 | Janiszewski | 74/574 |
| 5,307,710 A | * | 5/1994 | Feldhaus et al. | 74/574 |
| 5,562,542 A | * | 10/1996 | Rohrle | 464/67 |
| 5,562,543 A | * | 10/1996 | Rohrle | 464/68 |
| 5,626,518 A | * | 5/1997 | Maki et al. | 464/64 |
| 6,217,451 B1 | * | 4/2001 | Kooy et al. | 464/68 |
| 6,575,838 B2 | * | 6/2003 | Jackel et al. | 464/67 |
| 6,645,079 B2 | * | 11/2003 | Yoshimura | 464/68 |

FOREIGN PATENT DOCUMENTS

| | | | |
|---|---|---|---|
| DE | 199 58 814 | 6/2001 | .......... F16F/15/134 |
| DE | 100 59 709 | 6/2002 | .......... F16F/15/133 |

* cited by examiner

*Primary Examiner*—Kenn Thompson
(74) *Attorney, Agent, or Firm*—Cohen, Pontani, Lieberman & Pavane (57) ABSTRACT

A torsional vibration damper, especially a dual-mass flywheel, has a primary side and a secondary side, which is free to rotate around an axis of rotation relative to the primary side. Starting from a rotation in a direction of rotation around a forward base angle (γ), a forward base spring arrangement exerts a forward base restoring force on the secondary side. Starting from rotation around a forward auxiliary angle (δ), which is greater than the forward base angle (γ), a forward auxiliary spring arrangement exerts an additional forward auxiliary restoring force. Upon rotation around a forward limit angle (ε), both spring arrangements come to a stop together.

16 Claims, 6 Drawing Sheets

TORSIONAL VIBRATION DAMPER, ESPECIALLY A DUAL-MASS FLYWHEEL

BACKGROUND OF THE INVENTION

1. Field of the Invention

The present invention pertains to a torsional vibration damper, especially to a dual-mass flywheel, with a primary side and a secondary side, where the secondary side is free to rotate relative to the primary side around an axis of rotation; where, starting from a rotation in one rotational direction around a forward base angle, a forward base spring arrangement exerts a forward base restoring force on the secondary side; where, starting from a rotation in the rotational direction around a forward auxiliary angle, a forward auxiliary spring arrangement also exerts a forward auxiliary restoring force on the secondary side; and where the forward auxiliary angle is larger than the forward base angle.

2. Description of the Related Art

Torsional vibration dampers are used especially between the crankshaft of an internal combustion engine and the transmission to keep the torsional vibrations caused by the internal combustion engine away from the transmission. When the load direction is reversed from pushing to pulling, conventional torsional vibration dampers cause a jolt in the internal combustion engine, which can be misinterpreted by a system of monitoring sensors as the misfiring of the internal combustion engine. The torsional vibration dampers described above are used to minimize the jolt which occurs during a reversal in the load direction. A torsional vibration damper of this type with so-called asymmetric actuation is known from, for example, DE 199 58 814.

It was found in long-term tests that the spring arrangements of these torsional vibration dampers can suffer fatigue fractures, which lead to the failure of the torsional vibration dampers.

SUMMARY OF THE INVENTION

The task of the present invention is to improve a torsional vibration damper of the basic type in question in such a way that it has a longer service life.

The task is accomplished in that, upon rotation in the rotational direction around a forward limit angle, the forward base spring arrangement and the forward auxiliary spring arrangement come to a stop at the same time.

The inventors discovered that fatigue fractures are attributable to the fact that, when excessive loads are imposed on the torsional vibration damper according to the state of the art, only one of the spring arrangements comes to rest against a stop, whereas the other spring arrangement still allows the secondary side to rotate relative to the primary side. According to the state of the art, the spring arrangement which comes to rest against a stop is therefore subjected to much greater loads than the other spring arrangement and therefore also fractures sooner.

As a result of the design according to the invention, however, an excessive load, when it occurs, is distributed over both spring arrangements, so that the service life of the torsional vibration damper can be increased.

It is possible in theory to locate the spring arrangements within the same angular range (e.g., offset axially with respect to each other) and to actuate them by different actuating elements. In practice, however, the forward auxiliary spring arrangement is almost always located within an angular range, relative to the axis of rotation, different from that of the forward base spring arrangement.

The spring arrangements usually have spring elements and guide elements, on which the spring elements are supported. A design of this type is especially durable and works with very low friction. The guide elements in this case comprise at least outer guide elements, which are supported on support areas on the primary side and/or on driver elements on the secondary side.

It is possible to have the spring arrangements come to a stop together upon reaching the forward limit angle if adjacent guide elements of the forward base spring arrangement and adjacent guide elements of the forward auxiliary spring arrangement come in contact with each other upon rotation around the forward limit angle. The spring elements in this case can also be designed in such a way that the individual turns of the (helical) spring elements do not touch each other.

As a rule, the forward auxiliary angle is only slightly larger than the forward base angle. The forward base spring arrangement and the forward auxiliary spring arrangement can therefore have essentially the same effective rotational angle if:

(1) the support areas on the primary side are offset with respect to each other by a support point angle, and the driver elements on the secondary side are offset with respect to each other by a driver element angle;

(2) the support point angle is equal to the driver element angle;

(3) the guide elements have effective guide element lengths; and (4) the sum of the effective guide element lengths of the forward base spring arrangement is equal to the sum of the effective guide element lengths of the forward auxiliary spring arrangement.

If the guide elements of the forward base spring arrangement form pairs with the guide elements of the forward auxiliary spring arrangement and if the effective lengths of the two elements of each pair are equal, it is especially easy to guarantee that the sums of the effective guide element lengths will also be equal.

If the guide elements consist of a base polymer, carbon fibers, and a dry lubricant different from carbon fibers, where the amount of carbon fibers is in the range of 10–50 wt. % and the amount of dry lubricant does not exceed 30 wt. %, the guide elements will still be able to move with low friction even after prolonged periods of operation. With respect to preferred specific percentages, reference is made to DE 100 59 709.2.

The discussion above pertains exclusively to the rotation of the secondary side relative to the primary side in the rotational direction. In the case of rotation in the opposite direction, it is possible for the spring arrangements to be actuated symmetrically. It is also possible, however, even in the case of rotation in the opposite direction to realize asymmetric actuation. In this case, therefore, it is provided that (1) starting from a rotation in the opposite direction by a backward base angle, a backward base spring arrangement exerts a backward restoring force on the secondary side;

(2) starting from a rotation in the opposite direction around a backward auxiliary angle, a backward auxiliary spring arrangement also exerts a backward auxiliary restoring force on the secondary side;

(3) the backward auxiliary angle is greater than the backward base angle; and (4) upon rotation in the opposite direction by a backward limit angle, the backward base spring arrangement and the backward auxiliary spring arrangement both come to a stop together.

The backward base spring arrangement can, if desired, be identical in this case either to the forward base spring arrangement or to the forward auxiliary spring arrangement. The backward auxiliary spring arrangement would then be identical to the remaining spring arrangement.

Additional advantages and details can be derived from the following description of an exemplary embodiment in conjunction with the drawings, which are in the form of schematic diagrams.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
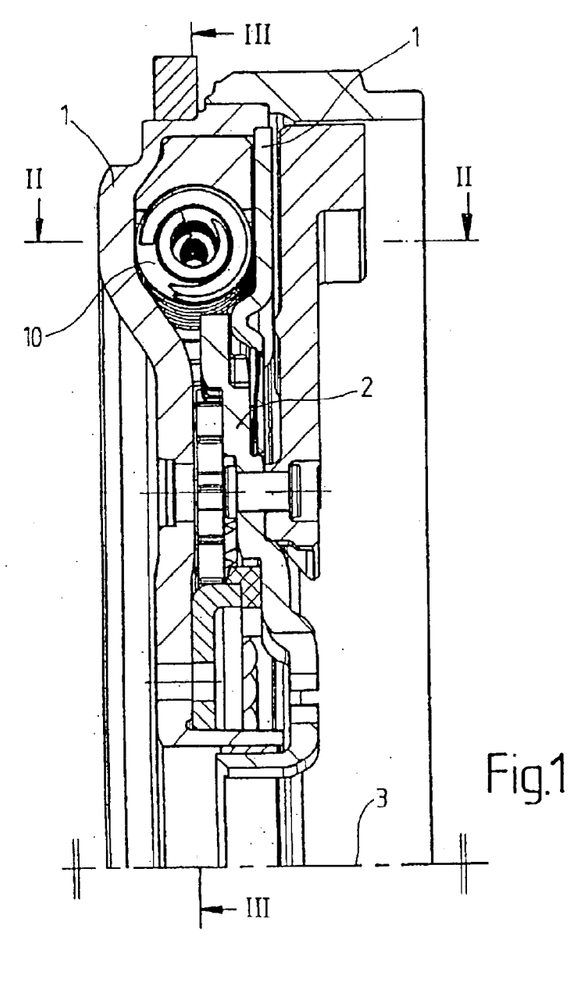
FIG. 1 shows a partial section through a torsional vibration damper.
Figure 2:
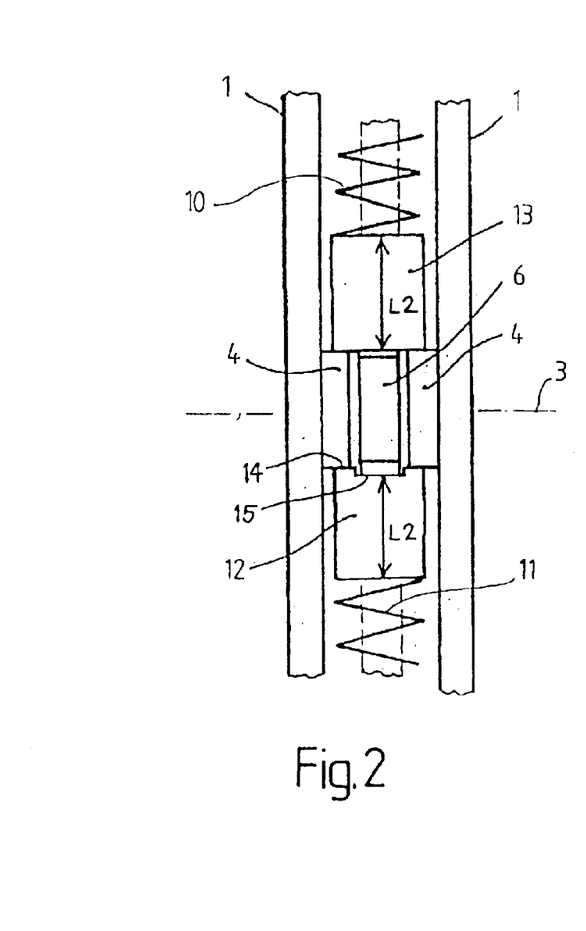
FIG. 2 shows a schematic diagram of a section along line II—II of FIG. 1.

According to FIGS. 1 and 2, a dual-mass flywheel as an example of a torsional vibration damper has a primary side 1 and a secondary side 2. The secondary side 2 is able to turn around an axis of rotation 3 relative to the primary side 1.

Figure 3:
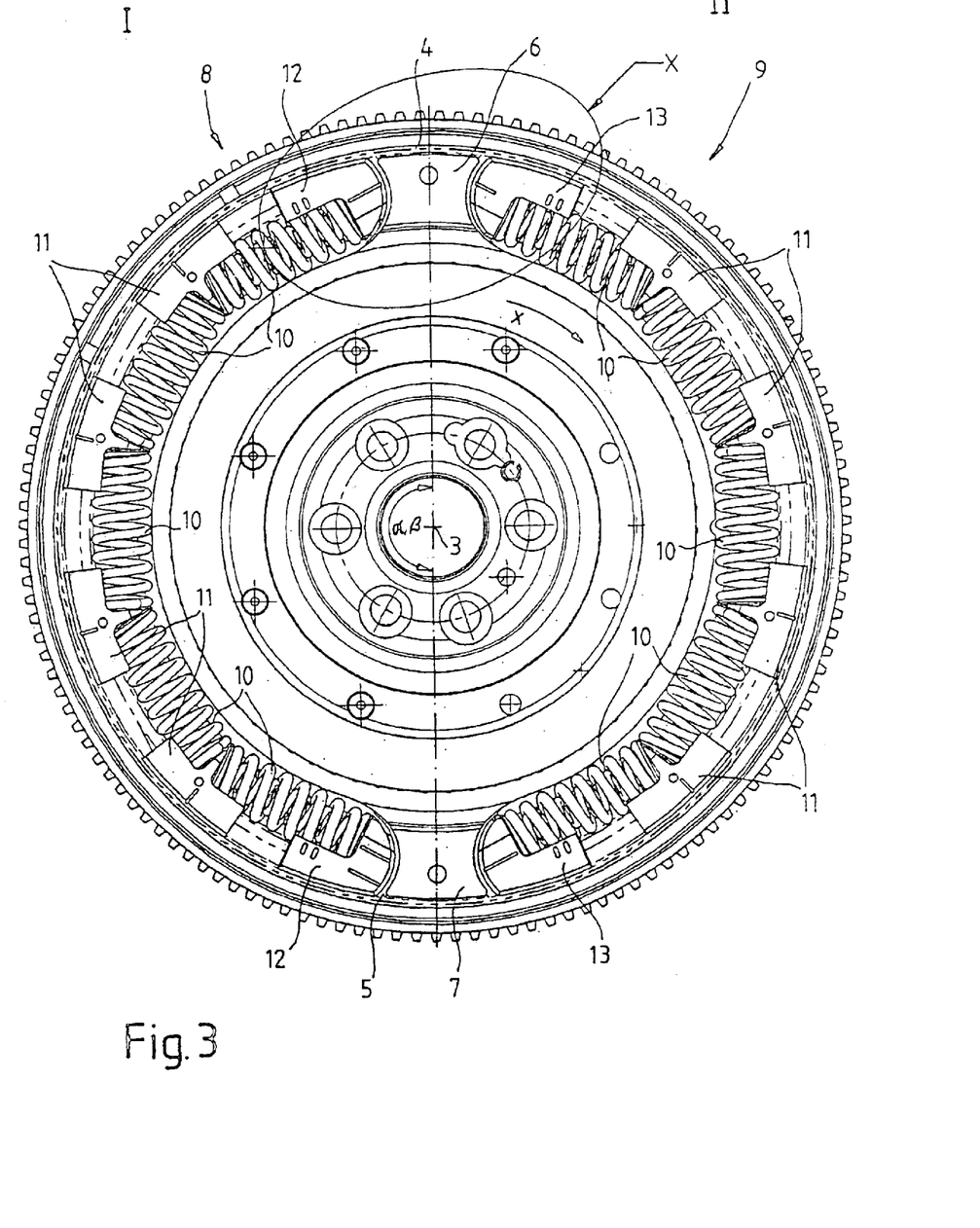
FIG. 3 shows a cross section through the torsional vibration damper of FIG. 1 along line III—III.

According to FIGS. 2 and 3, support areas 4, 5 are provided on the primary side 1. The support areas 4, 5 are offset with respect to each other by a support area angle α of 180°. Driver elements 6, 7 are attached to the secondary side 2, which are offset from each other by a driver element angle β, which is also 180°. The support area angle a and the driver element angle β are therefore equal to each other.

Spring arrangements 8, 9 have, according to FIG. 3, spring elements 10, inner guide elements 11, and outer guide elements 12, 13. The spring elements 10 are supported by the guide elements 11, 12, 13. By way of the outer spring guide elements 12, 13, the spring arrangements 8, 9 are also supported on the support areas 4, 5 and on the driver elements 6, 7.

It can be seen that the spring arrangements 8, 9 occupy angular ranges I, II relative to the axis of rotation 3, which are separate from each other.

The guide elements 11, 12, 13 consist preferably of a base polymer, carbon fibers, and a dry lubricant different from carbon fibers. A thermoplastic, especially a polyamide, can be used as the base polymer. The amount of carbon fibers is typically in the range of 10–50 wt. %, and especially in the range of 20–30 wt. %. The amount of dry lubricant different from carbon fibers is typically in the range of 5–15 wt. %. Molybdenum disulfide and polytetrafluoroethylene (Teflon) can be used as the dry lubricant.

The inner guide elements 11 are all designed in the same way. In particular, the effective length L1 is the same for all of the inner guide elements 11.

The outer guide elements 12, 13 also have effective outer guide element lengths L2. The outer guide elements 12, 13, however, are not all of the same design. The design of the two outer guide elements 12 in angular range I, that is, the outer guide elements 12 of the spring arrangement 8 on the left in FIG. 3, will be described in the following in conjunction with FIGS. 4 and 5.

Figure 4:
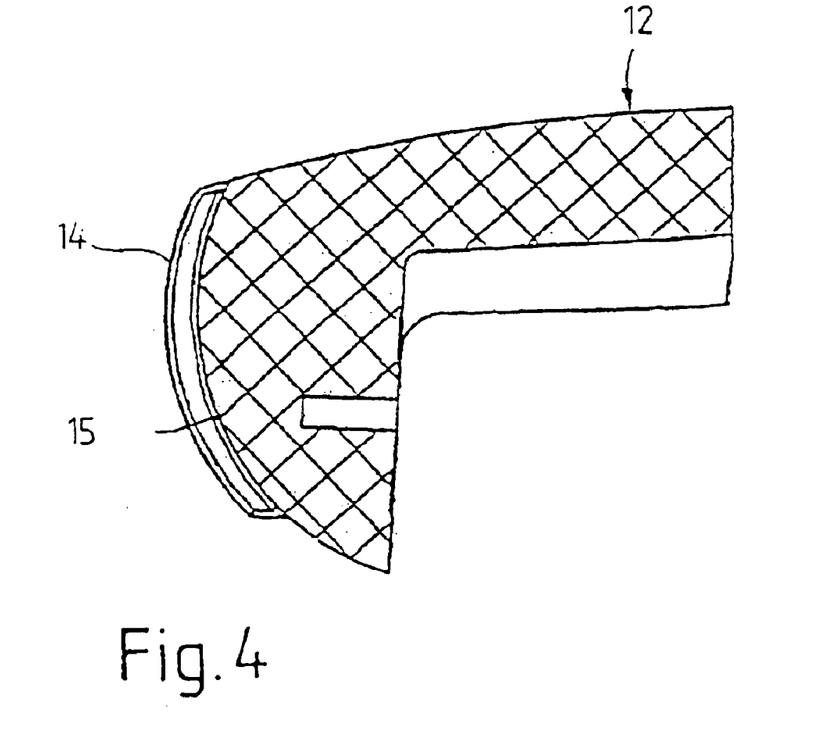
FIGS. 4 and 5 show an outer guide element.
Figure 5:
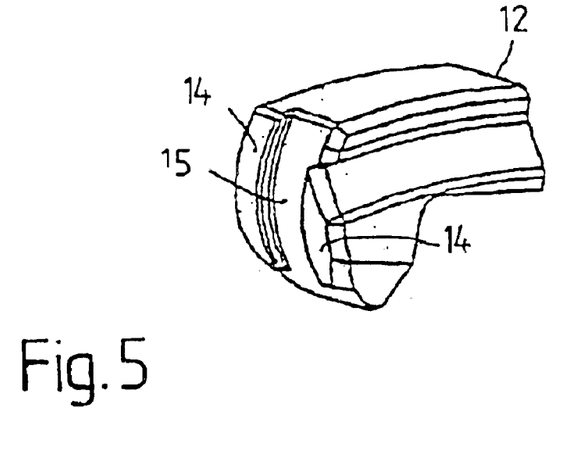

According to FIGS. 4 and 5, these two first outer guide elements 12 have shoulders 14 facing the support areas 4, 5; a groove 15 extends between these shoulders. The groove 15 is wide enough to allow the driver elements 6, 7 to fit into the groove 15. The effective length L2 of the outer guide elements 12 is therefore to be calculated from the base of the groove 15. The overall length, as measured from the shoulders 14, is longer than the effective length L2.

The second outer guide elements 13 of the other spring arrangement 9 do not have a groove 15 of this type. In their case, therefore, the effective length L2 of the outer guide element is to be calculated from the shoulders 14, and the overall length is also L2. These outer guide elements 13, however, are also dimensioned in such a way that their outer guide element length L2 is equal to the outer guide element length L2 of the other outer guide elements 12. The effective guide element lengths L1, L2 of the guide elements 11–13 of the spring arrangements 8, 9 are therefore equal to each other in a pairwise manner. Thus the sums of the effective guide element lengths L1, L2 of the one spring arrangement 8 are equal to the sum of the effective guide element lengths L1, L2 of the other spring arrangement 9.

Figure 6:
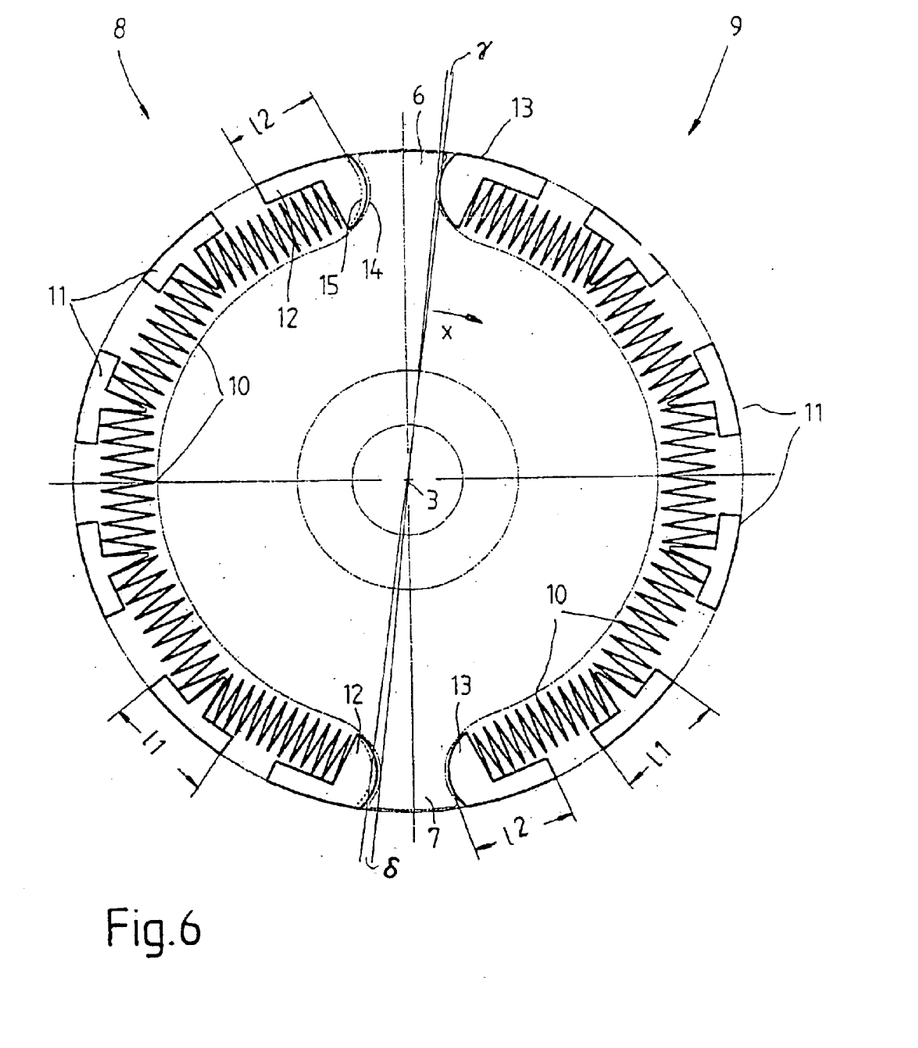
FIGS. 6–8 show schematic diagrams of the torsional vibration damper of FIG. 3.

The situation described above, especially the presence of the grooves 15, is illustrated again in schematic fashion in FIG. 6. The grooves 15 of the outer guide elements 12 are drawn in broken line in FIG. 6.

As can be seen in FIGS. 2, 3, and 6, the driver elements 6, 7 are slightly smaller than the support areas 4, 5. The secondary side 2 can therefore be turned without force relative to the primary side I in a first direction of rotation x around a small angle γ, called the "forward base angle" γ in the following. When the forward base angle γ is reached, however, the driver element 6 makes contact with the outer guide element 13 at the top of the spring arrangement on the right in FIGS. 3 and 6. Upon further rotation in rotational direction x, therefore, the spring arrangement 9 on the right exerts a base restoring force on the secondary side 2.

Upon reaching a slightly larger angle δ, called the "forward auxiliary angle" δ, the lower driver element 7 of the secondary side 2 reaches the base of the groove 15 of the outer guide element 12 at the bottom of the spring arrangement 8 on the left. Upon further rotation in the rotational direction x, therefore, not only the spring arrangement 9 on the right but now also the spring arrangement 8 on the left are deflected from their rest positions. Thus, starting from a rotation in rotational direction x around the forward auxiliary angle δ, a forward auxiliary restoring force also starts to act on the secondary side 2 in addition to the forward base restoring force.

The forward auxiliary angle δ, as already mentioned, is slightly larger than the forward base angle γ. The forward base angle γ is typically in the range between one and two degrees; the forward auxiliary angle δ is in the range between two and four degrees. The forward auxiliary angle δ, however, is always greater than the forward base angle γ.

Figure 7:
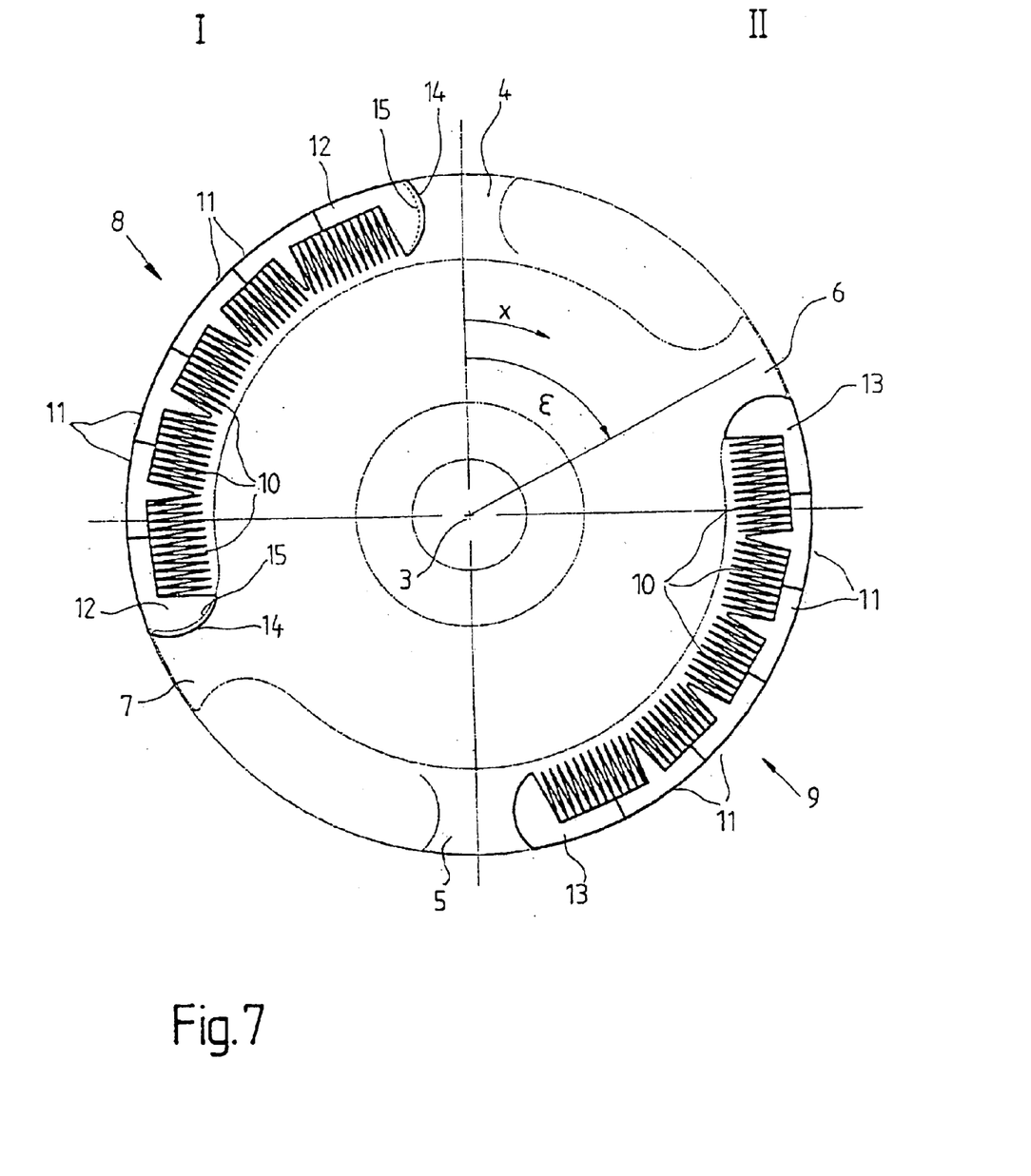

Upon further rotation in rotational direction x, as shown in FIG. 7, the spring elements 10 are compressed until the secondary side 2 has rotated relative to the primary side by a forward limit angles ε. This angles ε is defined as the angle at which adjacent guide elements 11, 12 of the spring arrangement 8 on the left make contact with each other. The left spring arrangement 8 therefore comes to a stop when the forward limit angle ε is reached.

As explained above, the sum of the effective guide element lengths L1, L2 of the guide elements 11, 12 of the left spring arrangement 8 is equal to the sum of the effective guide element lengths L1, L2 of the guide elements 11, 13 of the right spring arrangement 9. When the forward limit angle ε is reached, therefore, the adjacent guide elements 11, 13 of the right spring arrangement 9 also make contact with each other. Thus both spring arrangements 8, 9 come to a stop together when the forward limit angle ε is reached. This position is illustrated schematically in FIG. 7.

Because of the presence of the two outer guide elements 12 with a groove 15, what was stated above in conjunction with rotation in rotational direction x also applies to rotation in the direction opposite to x. Because of the specific design, the base angle γ, the auxiliary angle δ, and the limit angle ε have the same absolute values as they do in the case of rotation in the direction x. In principle, however, they could also be different.

In the case of the embodiment described in conjunction with FIG. 6 in which outer guide elements 12 with a groove 15 are provided both at the top end and at the bottom end of the left spring arrangement 8, then, regardless of whether the secondary side 2 is rotated in first direction x or in a second direction opposite to direction x relative to the primary side 1, the right spring arrangement 9 will always be deflected first. Only thereafter will the left spring arrangement 8 be deflected.

Figure 8:
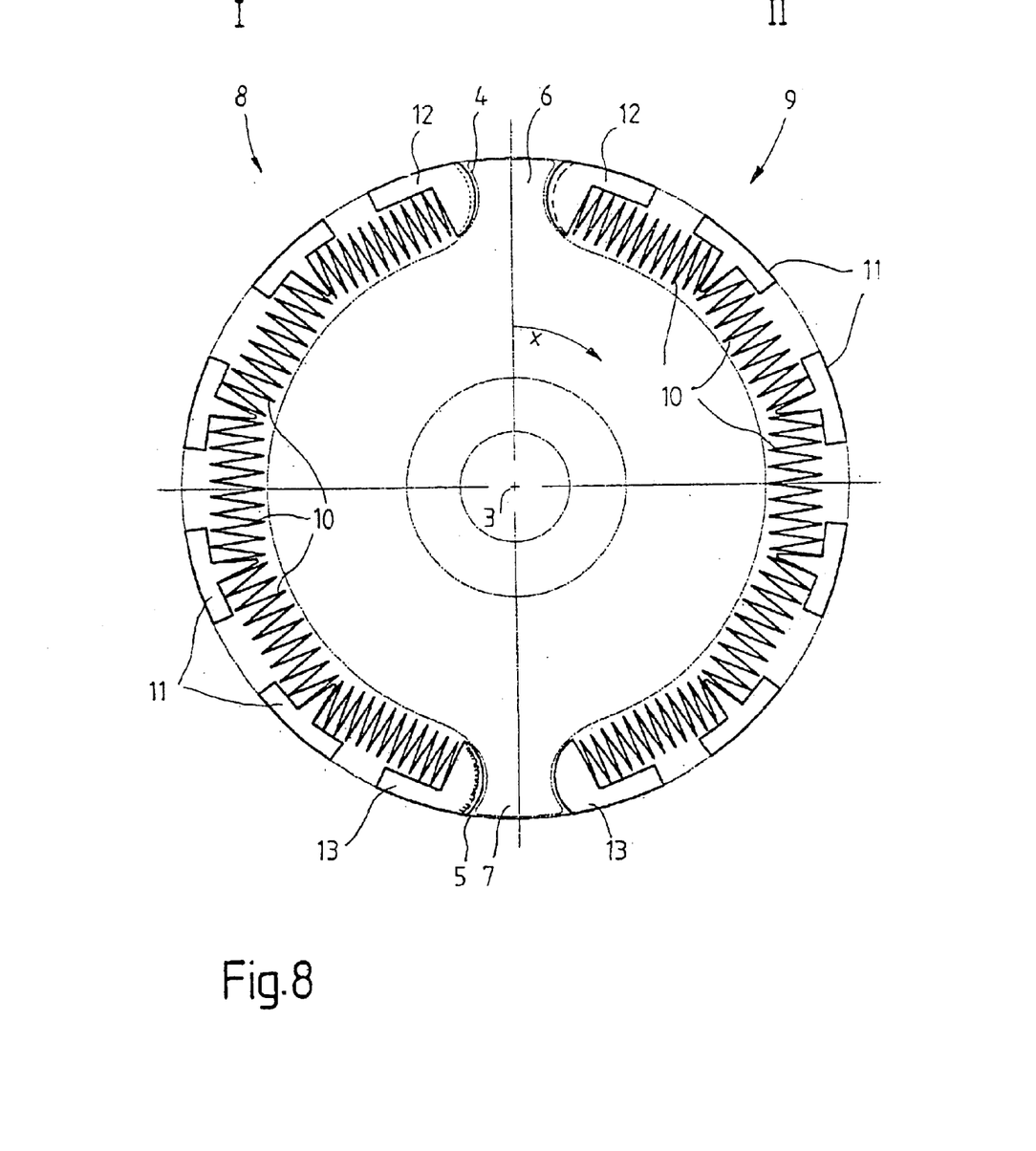

It is also possible, however, for the two guide elements 12 with the shoulders 14 and the groove 15 to be located to the left and to the right of the same driver element 6, 7. FIG. 8 shows this arrangement of grooved guide elements to the left and to the right of the upper driver element 6. In this case, rotation in the rotational direction x causes the left spring arrangement 8 to be deflected first from its rest position. Upon rotation in the direction opposite to x, the right spring arrangement 9 is deflected from its rest position first. The procedure is completely equivalent to the previous one described in conjunction with FIGS. 6 and 7.

As a result of the present invention, therefore, the effective forces are easily distributed over both spring arrangements 8, 9, which is especially advantageous when the loads are excessive. In practice, therefore, the maximum load to which one of the spring arrangements 8, 9 can be subjected is cut in half. The service life of the torsional vibration damper as a whole is increased significantly as a result.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A torsional vibration damper comprising:
   a primary side;
   a secondary side which is rotatable relative to the primary side;
   a forward base spring arrangement which deflects to exert a base restoring force on the secondary side when the secondary side exceeds a forward base angle relative to the primary side in a first direction of rotation, wherein the forward base angle is between one and two degrees; and
   a forward auxiliary spring arrangement which deflects to exert a forward auxiliary restoring force on the secondary side only when the secondary side exceeds a forward auxiliary angle relative to the primary side in said first direction of rotation, wherein the forward auxiliary angle is between two and four degrees;
   wherein said forward auxiliary angle is larger than said forward base angle, and wherein said forward base spring arrangement and said forward auxiliary spring arrangement stop deflecting simultaneously when said secondary side rotates around a forward limit angle relative to said primary side in said first direction of rotation.

2. A torsional vibration damper as in claim 1 wherein said base spring arrangement and said forward auxiliary spring arrangement occupy respective mutually exclusive angular ranges with respect to said axis of rotation.

3. A torsional vibration damper as in claim 1 wherein said base spring arrangement and said forward auxiliary spring arrangement each comprise spring elements and guide elements on which said spring elements are supported.

4. A torsional vibration damper as in claim 3 wherein said primary side comprises support areas and said secondary side comprises driver elements, said guide elements of each said spring arrangement comprising a pair of outer guide elements which are supported on at least one of said support areas and said driver elements.

5. A torsional vibration damper as in claim 4 wherein, when said secondary side rotates around said forward limit angle relative to said primary side, adjacent said guide elements of said base spring arrangement make contact with each other, and adjacent said guide elements of said forward auxiliary spring arrangement make contact with each other.

6. A torsional vibration damper as in claim 5 wherein said support areas are offset with respect to each other by a support area angle, and said driver elements are offset with respect to each other by a driver element angle which is equal to said support area angle, said guide elements each having an effective length, wherein the sum of the effective lengths of the guide elements of the base spring arrangement is equal to the sum of the effective lengths of the guide elements of the forward auxiliary spring arrangement.

7. A torsional vibration damper as in claim 6 wherein the guide elements form pairs comprising one guide element of the base spring arrangement and one guide element of the forward auxiliary spring arrangement in each pair, the effective lengths of the elements in each said pair being equal.

8. A torsional vibration damper as in claim 6 wherein each said outer guide elements comprise two first outer guide elements and two second outer guide elements, wherein said two first outer guide elements each have an overall length which is longer than said effective length.

9. A torsional vibration damper as in claim 8 wherein said first outer guide elements each have a pair of shoulders separated by a groove with a base, the effective length being measured circumferentially from the base of the groove, the overall length being measured circumferentially from the shoulders, said shoulders contacting said support areas before said forward auxiliary angle is exceeded, said base of one of said first outer guide elements contacting said driver element after said forward auxiliary angle is exceeded.

10. A torsional vibration damper as in claim 9 wherein both of said first outer guide elements are in one of the forward base spring arrangement and the forward auxiliary spring arrangement.

11. A torsional vibration damper arrangement as in claim 9 wherein each said first outer guide element is in a respective one of said forward base spring arrangement and said forward auxiliary spring arrangement.

12. A torsional vibration damper as in claim 4 wherein each said outer guide element is supported on one of a respective said driver element and a respective said support area when the secondary side exceeds said forward auxiliary angle relative to the primary side in the first direction of rotation.

13. A torsional vibration damper as in claim 3 wherein said guide elements consist of a base polymer, 10-50 wt. % carbon fibers, and a dry lubricant not exceeding 30%.

14. A torsional vibration damper as in claim 1 wherein one of said forward base spring arrangement and said forward auxiliary spring arrangement deflects to exert a backward base restoring force on the secondary side when the secondary side exceeds a backward base angle relative to the primary side in a second direction of rotation which is opposite to said first direction of rotation; and the other of said forward base spring arrangement and said forward auxiliary spring arrangement deflects to exert a backward auxiliary restoring force on the secondary side when the secondary side exceeds a backward auxiliary angle relative to the primary side in said second direction of rotation;

wherein said backward auxiliary angle is larger than said backward base angle, and wherein one of said forward base spring arrangement and said forward auxiliary spring arrangement and the other of said forward base spring arrangement and said forward auxiliary spring arrangement stop deflecting simultaneously when said secondary side rotates around a backward limit angle relative to said primary side in said second direction of rotation.

15. A torsional vibration damper as in claim 14 wherein one of said forward base spring arrangement and said forward auxiliary spring arrangement is the said forward base spring arrangement, and the other of said forward base spring arrangement and said forward auxiliary spring arrangement is the said forward auxiliary spring arrangement.

16. A torsional vibration damper comprising:

a primary side comprising support areas which are offset with respect to each other by a support area angle;

a secondary side which is rotatable relative to the primary side, said secondary side comprising driver elements which are offset with respect to each other by a driver element angle which is equal to said support area angle;

a forward base spring arrangement which deflects to exert a base restoring force on the secondary side when the secondary side exceeds a forward base angle relative to the primary side in a first direction of rotation, said forward base spring arrangement comprising spring elements and guide elements on which the spring elements of the forward base spring arrangement are supported, said guide elements comprising a pair of outer guide elements on which at least one of said support areas and said driver elements are supported; and a forward auxiliary spring arrangement which deflects to exert a forward auxiliary restoring force on the secondary side only when the secondary side exceeds a forward auxiliary angle relative to the primary side in said first direction of rotation, said forward auxiliary spring arrangement comprising spring elements and guide elements on which the spring elements of the auxiliary spring arrangement are supported, said guide elements comprising a pair of outer guide elements on which at least one of said support areas and said driver elements are supported;

wherein said forward auxiliary angle is larger than said forward base angle, and wherein adjacent said guide elements of said base spring arrangement make contact with each other and adjacent said guide elements of said auxiliary spring arrangement make contact with each other so that said forward base spring arrangement and said forward auxiliary spring arrangement stop deflecting simultaneously when said secondary side rotates around a forward limit angle relative to said primary side in said first direction of rotation, and wherein said guide elements each have an effective length, the sum of the effective lengths of the guide elements of the base spring arrangement being equal to the sum of the effective lengths of the guide elements of the auxiliary spring arrangement, and wherein said outer guide elements comprise two first outer guide elements and two second outer guide elements, wherein said two first outer guide elements each have an overall length which is longer than said effective length, said first outer guide elements each have a pair of shoulders separated by a groove with a base, the effective length being measured circumferentially from the base of the groove, the overall length being measured circumferentially from the shoulders, said shoulders contacting said support areas before said forward auxiliary angle is exceeded, said base of one of said first outer guide elements contacting said driver element after said forward auxiliary angle is exceeded.

* * * * *